US011705996B2

(12) United States Patent
Nguyen et al.

(10) Patent No.: US 11,705,996 B2
(45) Date of Patent: Jul. 18, 2023

(54) METHOD FOR USE IN TRANSMITTING URLLC DATA IN NR SYSTEM (71) Applicant: NEC CORPORATION, Tokyo (JP)

(72) Inventors: Phong Nguyen, Mulgrave (AU); Rajitha Palipana, Mulgrave (AU)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 17/043,893

(22) PCT Filed: Jul. 5, 2018

(86) PCT No.: PCT/JP2018/025586
§ 371 (c)(1),
(2) Date: Sep. 30, 2020

(87) PCT Pub. No.: WO2019/193773
PCT Pub. Date: Oct. 10, 2019

(65) Prior Publication Data
US 2021/0021380 A1 Jan. 21, 2021

(30) Foreign Application Priority Data
Apr. 3, 2018 (AU) .............................. 2018901084

(51) Int. Cl.
H04L 1/1867 (2023.01)
H04W 76/28 (2018.01)
H04L 5/00 (2006.01)
H04W 72/0446 (2023.01)
H04W 72/23 (2023.01)

(52) U.S. Cl.
CPC ............ *H04L 1/189* (2013.01); *H04L 1/1887* (2013.01); *H04L 5/0055* (2013.01); *H04W 72/0446* (2013.01); *H04W 72/23* (2023.01); *H04W 76/28* (2018.02)

(58) Field of Classification Search
CPC ..... H04L 1/189; H04L 1/1887; H04L 5/0055; H04L 1/1607; H04W 72/042; H04W 72/0446; H04W 76/28
USPC ....................................................... 370/329
See application file for complete search history.

(56) References Cited

U.S. PATENT DOCUMENTS

2017/0303248 A1 10/2017 Chatterjee et al.
2021/0289522 A1* 9/2021 Salim .................... H04L 1/1887

OTHER PUBLICATIONS

Huawei, "PDSCH reliability for URLLC", R1-1800058, Jan. 22-26, 2018. (From Applicant's IDS) (Year: 2018).*
"IMT Vision—Framework and overall objectives of the future development of IMT for 2020 and beyond", ITU-R M.2083-0, Sep. 2015, p. 1-19.

(Continued)

*Primary Examiner* — Mang Hang Yeung
(74) *Attorney, Agent, or Firm* — Sughrue Mion, PLLC (57) ABSTRACT

In the present invention, a common UL control channel resources is configured and scheduled for sharing among URLLC UEs (102) within a servicing cell. An enhanced HARQ-less transmission technique (20) is employed for delivering DL URLLC data packets to the intended UEs (102). On DL URLLC data transmission basis, via a scheduling DCI, a gNB (101) dynamically indicates to the intended URLLC UE (102), the UL control resource including the time slots for use in transmitting limited acknowledge information.

20 Claims, 11 Drawing Sheets (56) References Cited

OTHER PUBLICATIONS

"Study on NR New Radio Access Technology", 3GPP TR 38.802 V14.2.0, Release 14, Sep. 2017, 145pages.
"Feasibility Study on New Services and Markets Technology Enablers", 3GPP TR 22.891 V14.2.0, Release 14, Sep. 2016, 95pages.
"Study on Scenarios and Requirements for Next Generation Access Technologies", 3GPP TR 38.913 V14.3.0, Release 14, Jun. 2017, 39pages.
"PDSCH reliability for URLLC", 3GPP TSG RAN WGI Ad Hoe Meeting, R1-1800058, Jan. 22-26, 2018, 10pages.
"Final Report of 3GPP TSG RAN WG1 #AH_1801 v1.0.0", 3GPP TSG RAN WG1 Meeting #92, R1-1801302, Feb. 26, 2018-Mar. 2, 2018, 114pages.
NEC, "On enhancing reliability of PDCCH", 3GPP TSG RAN WG1 Meeting #92bis, R1-1804234, Apr. 15, 2018-Apr. 20, 2018, 2pages.
Intel Corporation, "Ultra-reliability for NR PDCCH", 3GPP TSG RAN WG1 Meeting#90, R1-1712575, Aug. 21, 2017-Aug. 25, 2017, 5pages.
International Search Report for PCT/JP2018/025586 dated May 20, 2019 [PCT/ISA/210].

\* cited by examiner

METHOD FOR USE IN TRANSMITTING URLLC DATA IN NR SYSTEM

CROSS REFERENCE TO RELATED APPLICATIONS

This application is a National Stage of International Application No. PCT/JP2018/025586 filed Jul. 5, 2018, claiming priority based on Australian Patent Application No. 2018901084 filed Apr. 3, 2018, the disclosure of which is incorporated herein in its entirety by reference.

TECHNICAL FIELD

The present invention relates generally to the transmission and reception of URLLC signals in next generation or 5G wireless communication system. More specifically, the present invention has particular, although not exclusive application to methods for use with HARQ-less transmission technique on detection of control channel's misses-detection at an intended UE.

Abbreviations

| | |
|---|---|
| 3GPP | 3rd Generation Partnership Project |
| 4G | 4th generation |
| 5G | 5th generation |
| ACK | Positive acknowledgment |
| DL | Downlink |
| DTX | Discontinuous transmission |
| eMBB | Enhanced MBB |
| gNB | Logical Access node handling transmission/reception in multiple TRPs in a NR system. Commonly, corresponding to NR-base station |
| ID | Identity |
| IMSI | International Mobile Subscriber Identity |
| ITU | International Telecommunication Union |
| LTE | Long term evolution |
| LTE-A | Advanced LTE or 4G |
| LTE-A Pro | LTE Advanced Pro. 3GPP LTE Release 13 and 14; In layman's term it may be called 4.5G, 4.5G Pro, 4.9G |
| MBB | Mobile Broadband |
| NACK | Negative acknowledgment |
| NR | New Radio |
| N-RAT | New RAT |
| NR-UE or UE | User equipment with new radio capability |
| OFDM | Orthogonal Frequency-division multiplexing |
| RAN | Radio Access network |
| RAN-WG1 or RAN1 | Radio Access Network - Working Group 1 or Radio layer 1 working group |
| RAT | Radio Access technology |
| SCS | Sub Carrier Spacing |
| TRP | Transmission-Reception Point |
| TTI | Transmission Time Interval |
| UL | Uplink |
| URLLC | Ultra-reliable-low latency communications |

BACKGROUND ART

The reference to any prior art in this specification is not, and should not be taken as an acknowledgement or any form of suggestion that the prior art forms part of the common general knowledge.

Future wireless services will have to support emerging mission critical use cases with varying service requirements. Mission critical use cases that require Ultra-high Reliability and Low Latency, collectively known as URLLC, are identified in references (NPL 2) and (NPL 3) as moving ambulance and bio-connectivity, industrial control and connectivity for drones. Analysis of different URLLC use cases shows that there is a need to support varying levels of reliability and latency requirements. The most stringent user plane latency requirement for delivering application layer message is specified in (NPL 5) to be 0.5 ms for both downlink and uplink communication directions. The reliability requirements, on the other hand, is associated with a certain packet size and a latency requirement. For example, the most stringent reliability requirement is specified as $(1-10^{-5})$ for a packet size of 32 bytes delivered within user plane latency of 1 ms. In addition, other mission critical use cases have varying service requirements for reliability and latency, ranging from $(1-10^{-5})$ to $(1-10^{-4})$ and 0.5 ms, 1 ms to 10 ms, and 150 ms, respectively.

The system design for supporting URLLC must have sufficient adaptability to different latency and reliability requirements to utilize the scarce radio resources efficiently. Compared to previous LTE based cellular systems, several enhancements to the physical air interface for enabling latency reduction have been introduced in the 3GPP 5G (known as NR within the 3GPP community) Release 15 specification approved in December 2017. These include larger subcarrier spacing, $2\mu \times 15$ kHz where $\mu=\{0, 1, 2, 3, 4\}$ and 15 kHz being the base subcarrier spacing for LTE based mobile broadband, for shorter symbol lengths and shorter transmission time interval, also known as mini-slot or non-slot, through the aggregation of less than 14 symbols as used in slot-based transmissions of LTE/NR based mobile broadband. Further reduction in latency can be achieved through early decoding of data using front loaded DMRS and self-contained slots with flexible partitioning of downlink and uplink symbols. On the other hand, meeting stringent reliability requirements was not part of the 3GPP specifications approved in December 2015. The specification of features relating to reliability will be part of next phase of 3GPP Release 15, targeting June 2018.

LTE-based asynchronous HARQ for adaptive DL transmission enabling data to be transmitted quickly and reliability has been proven as an effective method for use in realising MBB/eMBB in LTEs and NR system. However, the associated delay for ensuring sufficient reliability based on such stop-and-wait HARQ technique could be prohibitively large for latency sensitive URLLC services/applications. On the other hand, HARQ-less transmission technique used for LTE side-link-communication where the maximum number repetition or redundancies are always transmitted according to predefined repetition/retransmission patterns is proven to be within the latency requirement bound. However, such maximum number of re-transmissions could be very spectrally inefficient as precious time-frequency resources will have to be reserved for multiple re-transmissions of a data channel despite the UE being able to decode the associated data channel at the initial transmission with high probability. In an attempt to conserve precious time-frequency resources for other use, a variation of the HARQ-less transmission technique was proposed in (NPL 5) where some of the re-transmission could be terminated early i.e. prior to the arrival of scheduled time-units (e.g. slot) given that the gNB is aware of the successful reception of data channel. This approach is known as re-transmission with early termination upon positive feedback. The downside of the HARQ-less transmission technique and the mentioned variation technique is the unnoticed missed detection of control channel at the intended UE, which makes the transmission, and re-transmission of associated data channel useless. The Applicant has perceived a need to address the foregoing disadvantage as discussed in the detail description of preferred embodiments below.

The preferred embodiment of the present invention is directed to the enhancement that shall be used in compliment with the HARQ-less transmission technique in realising the missing control channel link adaptation and eliminating the existing spectrum inefficiency, which may at least partially overcome at least one of the foregoing disadvantages, or fulfil at least one of the requirements identified above, or provide the consumer with a useful or commercial choice.

CITATION LIST

Non Patent Literature

NPL 1: ITU-R M.2083-0 (September/2015)—IMT Vision—Framework and overall objectives of the future development of IMT for 2020 and beyond.
NPL 2: TR 38.802—Study on NR New Radio Access Technology (Release 14).
NPL 3: 3GPP TR 22.891 V14.2.0 (September 2016), Feasibility Study on New Services and Markets Technology Enablers, (Release 14).
NPL 4: TR 38.913—Study on Scenarios and Requirements for Next Generation Access Technologies (Release 14).
NPL 5: Tdoc—R1-1800058; PDSCH reliability for URLLC.
NPL 6: 3GPP TSG RAN WG1 #91, RAN1_AH_1801, RAN1 Chairman's Notes.

SUMMARY OF INVENTION

Solution to Problem

According to one aspect of the present invention, there is provided a method for realising control channel link adaptation and early termination of data channel retransmission upon control channel missed-detection using a system, the system for a servicing a gNB, which utilises HARQ-less for URLLC DL data transmission, to detect a control channel miss-detection at URLLC UEs, the method comprising:
1.1. at the gNB, determining and allocating UL control resources for sharing among the URLLC UEs in transmitting limited acknowledgement information;
1.2. at the gNB, configuring the URLLC UEs with information on the shared UL control resources for further selection when having the limited acknowledgement information for transmission;
1.3. at the gNB, upon the arrival of a URLLC transport block for DL transmission, scheduling and transmitting a control channel to the intended UE providing scheduling information including a re-transmissions pattern having first slot and one or more second slots;
1.4. at the gNB, following the transmitted control channel, transmitting the associated data channel's re-transmissions in the first slot and in one or more second slots of the re-transmission pattern;
1.5. at a URLLC UE, monitoring one or more CORESETs and associated search spaces per configuration, for intended control channels or intended set of scheduling information for:
  associated data channel's re-transmission reception and decoding, and
  UL control channel resource selection in transmitting limited acknowledgement information;
1.6. at the URLLC UE, upon successful detection of an intended set of scheduling information:
in the first slot of the re-transmission pattern, performing the reception and decoding of the scheduled data channel's re-transmissions; and on the UL control resource within the slot that corresponds to the first slot of the re-transmission pattern, transmitting ACK or NACK as explicit indication to the servicing gNB;
1.7. at the gNB, monitoring the UL control channel resources slot that corresponds to the first slot having the transmitted data channel's re-transmission, for explicit indication of ACK or NACK from the intended URLLC UE;
1.8. at the URLLC UE, upon the unsuccessful reception and decoding of all data channel's re-transmissions scheduled within the first slot, in the second slot per indicated re-transmission pattern:
  performing the reception and decoding of any remaining scheduled data channel's re-transmissions; and
  on the UL control resource within the slot that corresponds to a second slot of the re-transmission pattern, transmitting ACK as explicit indication to the servicing gNB upon successful reception and decoding of a data channel's re-transmission scheduled in the second slot; and
1.9. at the gNB, monitoring the UL control resource slot that corresponds to a second slot having the transmitted data channel's re-transmission, for explicit indication of ACK from the URLLC UE.

According to one embodiment of the present invention, a common UL control channel resources is configured and scheduled for sharing among URLLC UEs within a servicing cell. In this instance, a HARQ-less transmission technique is employed for delivering DL URLLC data packets to the intended UEs. On DL URLLC data transmission basis, via a scheduling DCI, a gNB dynamically indicates to the intended URLLC UE, the UL control resource including the time slots for use in transmitting limited acknowledge information.

According to another embodiment of the present invention, on the configured UL control resource within in the slot corresponding to the first slot having associated data channel' re-transmissions, a URLLC transmits ACK or NACK upon the successful detection of a control channel followed by the success of at least one associated data channel's re-transmission or unsuccessful decoding of all associated data channel's re-transmissions scheduled in the said first slot. The absence of signal in the configured UL control resource within in the slot corresponding to the first slot having associated data channel's re-transmission, will results in "DTX" being observed at the servicing gNB which implicitly indicates the control channel's missed detection at the intended UE. Following the 'NACK' being explicitly reported to the serving gNB, on the configured UL control resource within in the slot corresponding to a second slot having associated data channel' re-transmissions, a URLLC UE transmits 'ACK' upon the success of at least one associated data channel's re-transmission in the said second slot. The absence of signal in the configured UL control resource within the slot, corresponding to the second slot having associated data channel's re-transmissions, will results at "DTX" being observed at the servicing gNB, implicitly indicates the occurring unsuccessful decoding of the associated data channel's re-transmissions.

Any of the features described herein can be combined in any combination with any one or more of the other features described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

References will now be made in detail to the preferred embodiments of the invention, examples of which are illustrated in accompanying drawings. Where possible, the same reference numbers will be used throughout the drawings to refer to the same or like parts.

Figure 1:
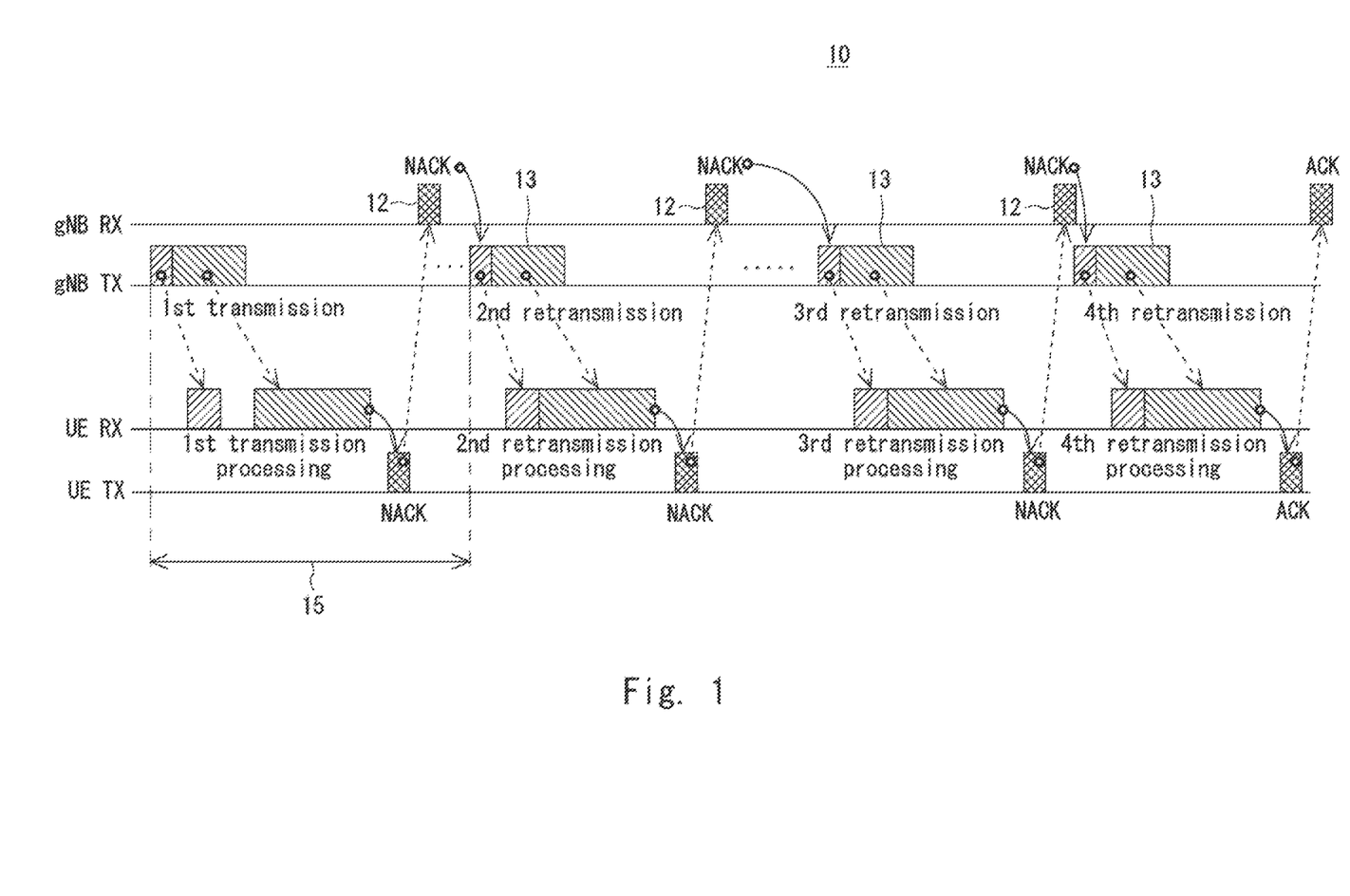
FIG. 1: H-ARQ Downlink transmissions in realising reliability according to the related art.

FIG. 1 schematically illustrates a LTE-based asynchronous HARQ (10) for adaptive DL transmission enabling data to be transmitted quickly and reliability, where MCS for each retransmission (13*s*) upon received NACK (12*s*) can be adaptively adjusted according to the DL channel state information, to improve the reliability on each retransmission. The said technique definitely provides a mechanism to ensure the reliability of DL data transmission including the mechanism implicitly indicating the missed detection of control channel (i.e. DTX on expected ACK/NACK feedback resources), providing scheduling information for the reception and decoding of the associated data channel(s), for control channel link adaptation. However, the long latency induced in each transmission and/or retransmission cycle (e.g. 15) making the technique unsuitable for use in realising URLLC.

Figure 2:
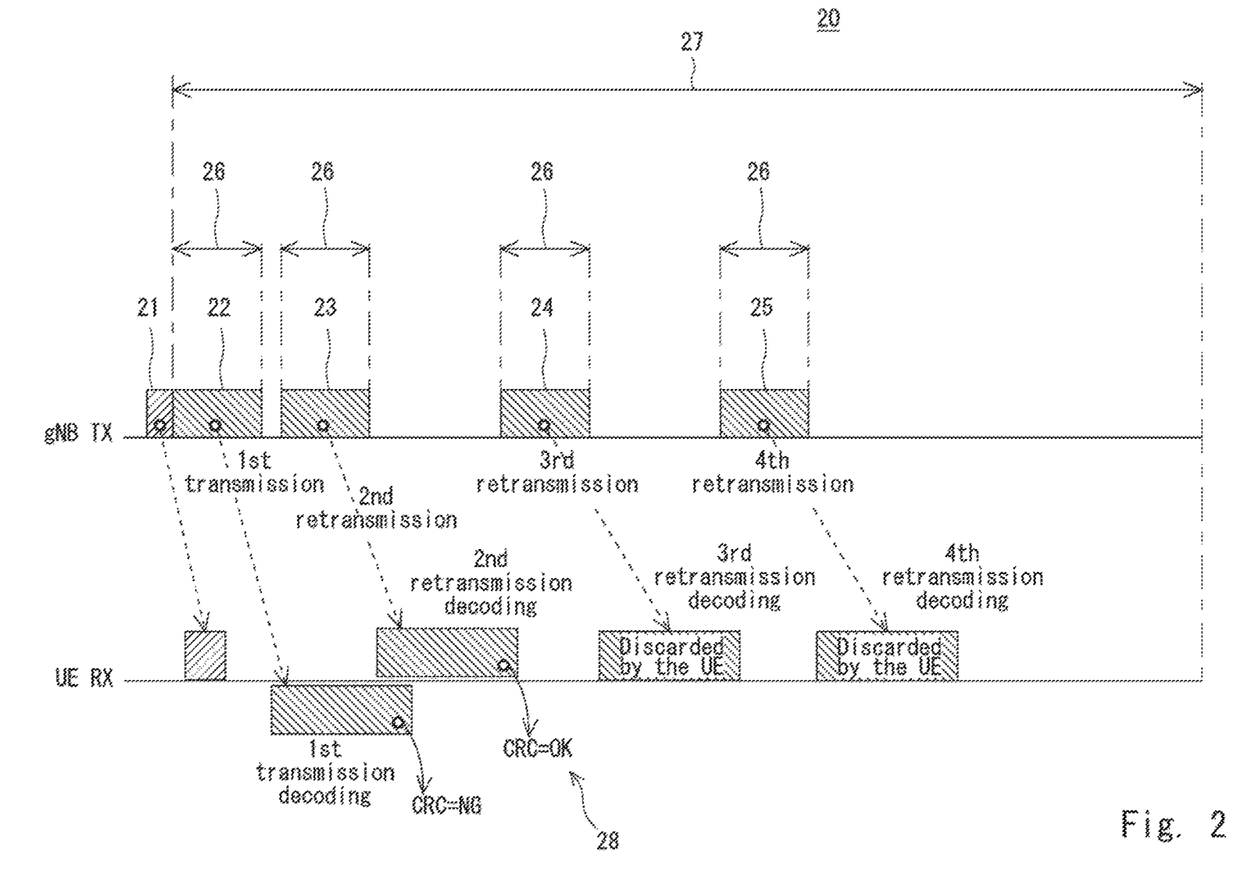
FIG. 2: H-ARQ-less Downlink transmissions in realising reliability according to the related art.

In an attempt to eliminate or improve the latency induced by HARQ process, RAN-WG1 has discussed and considered HARQ-less transmission technique (20), which is illustrated through FIG. 2, to shorten end-to-end latency. According to the said HARQ-less transmission technique (20), the maximum number of redundancies (e.g. 4) corresponding to a L1 data transport block are always transmitted repeatedly (e.g. 22, 23, 24, 25) in predefined time-pattern (e.g. 26), or predefined frequency-pattern, or predefined time-frequency pattern within a desirable timing window (e.g. 27), hoping the transport block is successfully decoded at the first transmission or using some (e.g. 28) or all retransmissions. The disadvantage of this technique is that a receiver (i.e. UE) may successfully decode a transmitted transport block (e.g. 28) at the first transmission, or the first few transmission/retransmission (e.g. 23), therefore making any subsequent retransmissions appears redundant (e.g. e.g. 24 and 25).

Figure 3:
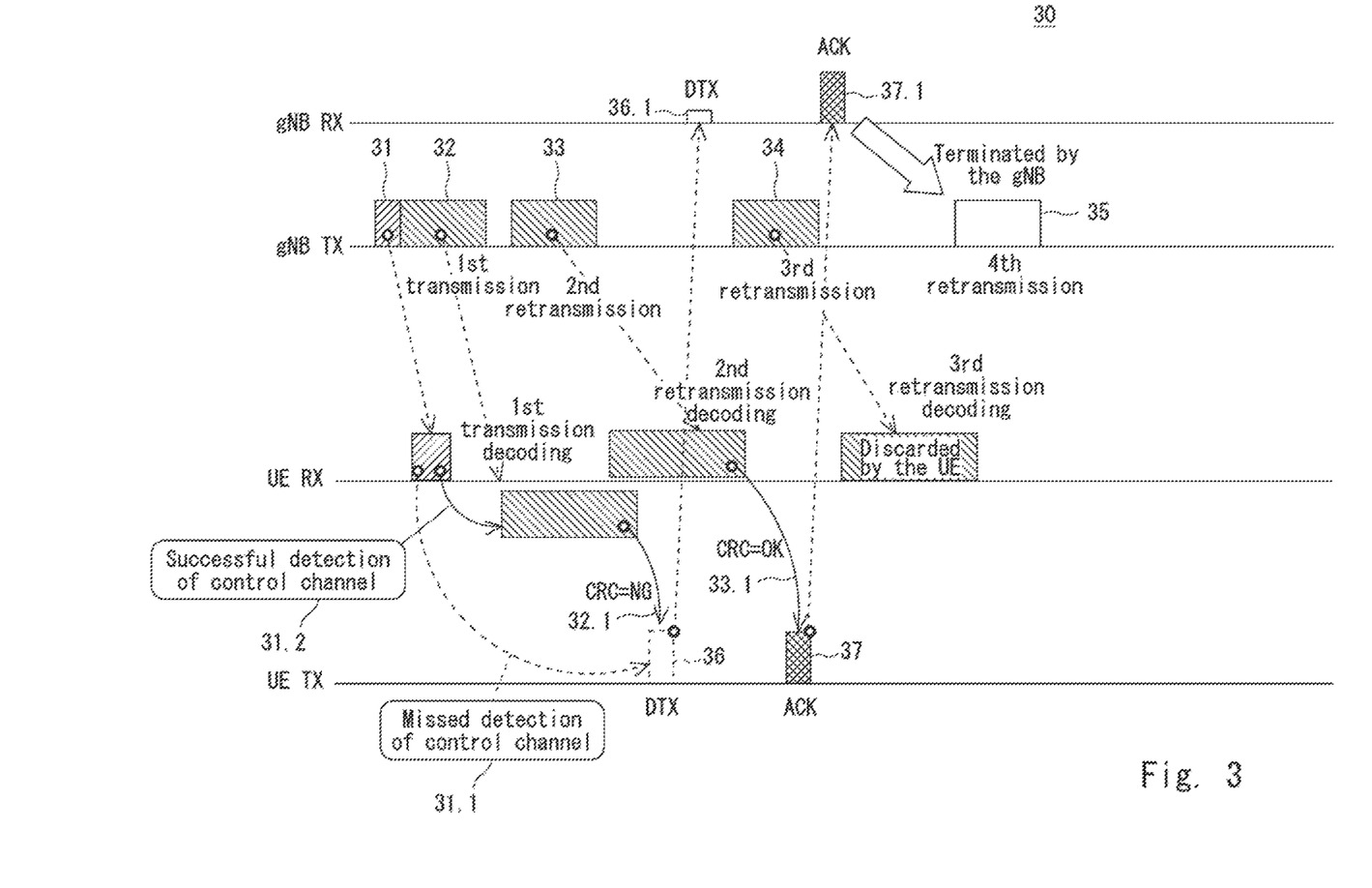
FIG. 3: H-ARQ-less Downlink transmissions with early termination in realising reliability according to the related art.

In an attempt to conserve resources being allocated for redundant transmission(s) for other usage in the case where a UE successfully decodes the associated data channel at the first attempt, a technique called "early termination HARQ-less" (30) illustrated in FIG. 3 is recommended. In this instance, positive acknowledgement (e.g. 37) upon a successful decoding of a transport block (e.g. 33.1) is explicitly fed back to the transmitter (i.e. base station), which allows the transmitter or base station to terminate any future retransmission corresponding to the successfully received transport block (e.g. 35). The "early termination HARQ-less" method is also capable of implicitly indicating if a transmitted transport block is unsuccessfully decoded using DTX (e.g. 36 & 36.1) where the original "HARQ-less" cannot. Although the "early termination HARQ-less" method can implicitly indicate the unsuccessful decoding attempt on associated data channel (32.1, 36 & 36.1), upon the successful detection of the control channel (31 & 31.2), it cannot differentiate from failure caused by the undetected control channel (e.g. 31, 31.1, 36 and 36.1) as both cases (31.1 and 32.1) result at "DTX" (36).

In an effort to improve control channel (e.g. 31) reliability so that the transmission and retransmission of a transport block (e.g. 32, 33, 34 and 35 FIG. 3) are not wasted due to missed detection (e.g. 31.1) of the control channel (e.g. 31), RAN-WG1 has recently considered control channel (i.e. PDCCH e.g. 31) repetition or duplication. Technically, applying repetition or duplication of a control channel may improve the probability of control channel detection at the receiver. However it will unnecessary (in some cases such as good channel condition where single control channel transmission is sufficient) increase the control channel blocking probability and/or may increase number of blind decoding attempts at a receiver (i.e. UE). Unfortunately, the repetition or duplication of a control channel can neither guarantee the successful detection of control channel and/or its repetition at the intended receiver (i.e. UE), nor provide mechanism to indicate the miss-detection of control channel detection at an intended UE. The early indication of control channel missed detection at the intended UE to the gNB will not only provide mechanism for the gNB to terminate the remaining retransmission of data channels, but also provide indication for the gNB to adjust the future transmission of control channel including applying appropriate aggregation level and/or increase number of retransmission/repetition.

Having outlined the concept of prior art in "LTE-based asynchronous HARQ" (10—FIG. 1) and "HARQ-less" (20—FIG. 2), and "early termination HARQ-less" (30—FIG. 3), as well as discussed their advantages and disadvantages for use in realising URLLC, there is proposed a method, that will be discussed in the subsequent paragraphs, for use in complement to "HARQ-less" and assisting in eliminating the highlighted disadvantages.

The said method will
not only retain
1. low end-to-end latency of "HARQ-less" method (20—FIG. 2), and
2. early termination of data channels transmission in the "early termination HARQ-less" method (30—FIG. 3);

but also provide a mechanism for realising
1. indication of control channel's missed-detection at an intended UE for use with low latency "HARQ-less" method,
2. early termination of associated data channels transmission upon the missed detection of a control channel or control channels,
3. control channel link adaptation on the new transmission, and
4. implicit indication of negative acknowledgement of associated data channel retransmission or redundancies, which enable the transmitter or base station to take appropriate action without waiting for package time out.

Figure 4:
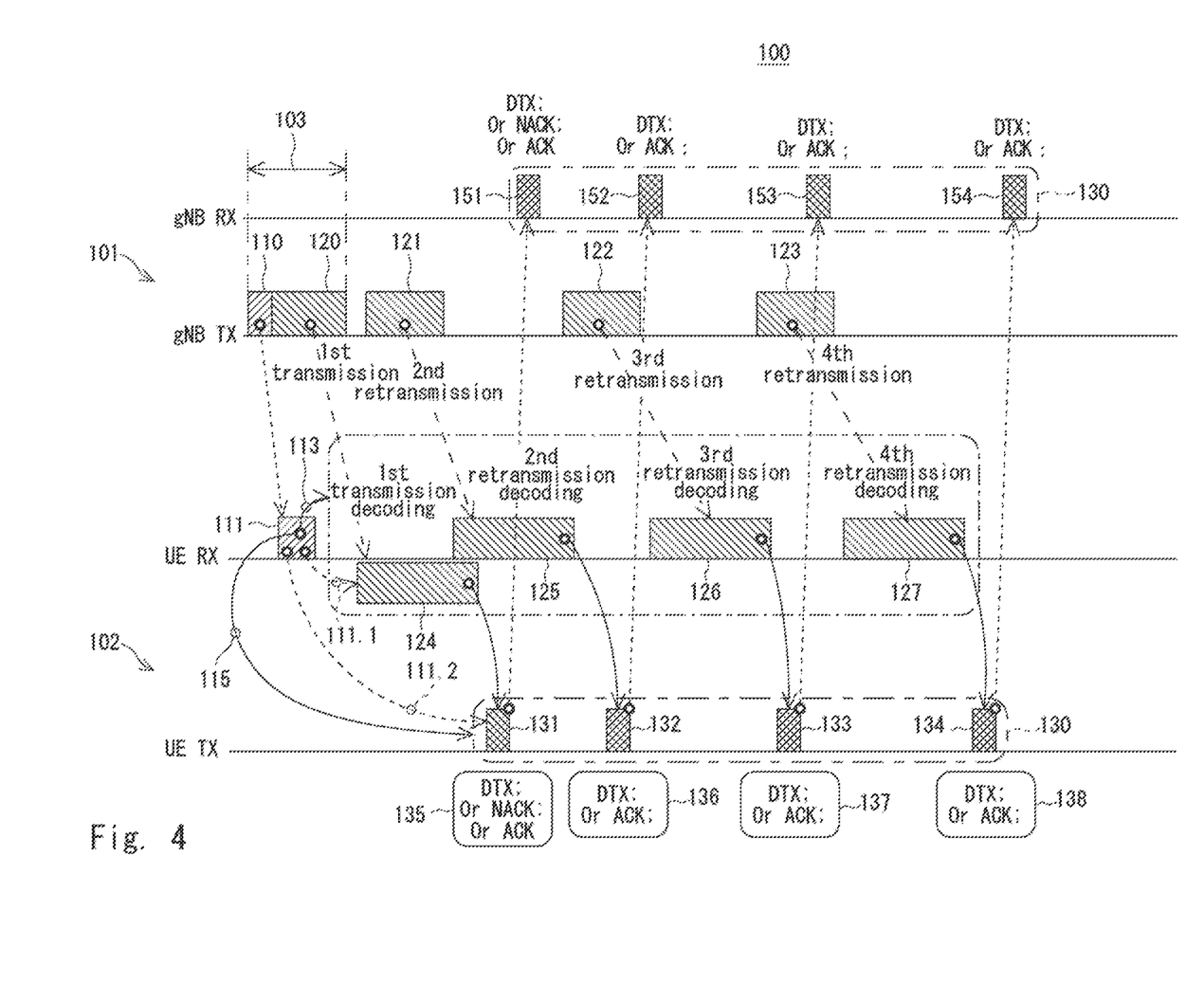
FIG. 4: Novel acknowledgment procedure for use with H-ARQ-less Downlink transmissions in realising ultra-reliability according to an embodiment of the present of invention.

In reference to FIG. 4 which exemplarily illustrates the concept of the preferred embodiment, the concept comprises steps:
1. Like the above discussed "HARQ less" method (20—FIG. 2),
1.1. upon the arrival of URLLC data packet(s) for transmitting to an intended UE (e.g. 102), the gNB (e.g. 101) allocates resources in the scheduled time-units (e.g. 103, slots) and via one or multiple TRPs transmits the control channel or control channel and its repetition using appropriately determined aggregation level (e.g. 110). The transmission of the control channel(s) is followed by the maximum or configurable number (e.g. 4) of retransmission of associated data channels in time-repetition pattern (e.g. 120, 121, 122, and 123) or frequency-repetition pattern, or time-frequency repetition pattern. In this instance, the control channel (e.g. 110) is said to carry the scheduling information (e.g. 113) for the reception and decoding of the associated data channel and its repetition, and information on selecting UL control resources (e.g. 115) in transmitting the limited acknowledgment information to the servicing gNB;
1.2. A UE that expects to receive DL URLLC data (e.g. 102) shall, in time-units such as slots (e.g. 103) in one or multiple search spaces within one or multiple CORESET, monitor DL control channels for at least one control channel carrying scheduling information intended for it (e.g. 111). Upon the successful detection control channel intended for it (e.g. 111.1), the UE shall follow the indicated data channel's re-transitions (e.g. 120, 121, 122, and 123), and in one attempt or multiple attempts receive and decode the data channel (e.g. 124) or the data channel and its repetitions (e.g. 124, 125, 126 and 127). Upon the successful reception and decoding of the associated data channel, the UE may ignore the current and/or future repetition of the same data channel.
2. Similar to the above discussed "early termination HARQ less" method (30—FIG. 3); the gNB (e.g. 101) allocates UL control resources for the UE (e.g. 102) to feedback the acknowledgement information to the servicing gNB (e.g. 101).

However, unlike the "early termination HARQ less" method, and according to the present embodiment,
2.1. The UL control resources being configured for limited acknowledgement information reporting (e.g. 130) is the common UL control resource configured for sharing among URLLC UEs or UEs with activated URLLC services in the same serving cell;
2.2. The acknowledgement information for explicit feedback to the servicing gNB is said to be limited and depend on whether the allocated control UL resources corresponds to the first time-unit in the indicated retransmission pattern (e.g. 131), or the allocated control UL resources corresponds to the subsequent time-units in the same retransmission pattern (e.g. 132, 133 and 134);
2.2.1. In one embodiment of the present invention, in the allocated control UL resources corresponding to the first time-unit having the associated data channel transmission(s) (e.g. 131 and 120), the UE should use ACK (i.e. positive acknowledgement and NACK (i.e. negative acknowledgement) as explicit indication, and 'DTX' as implicit indication to its servicing gNB (e.g. 135).

Figure 5:
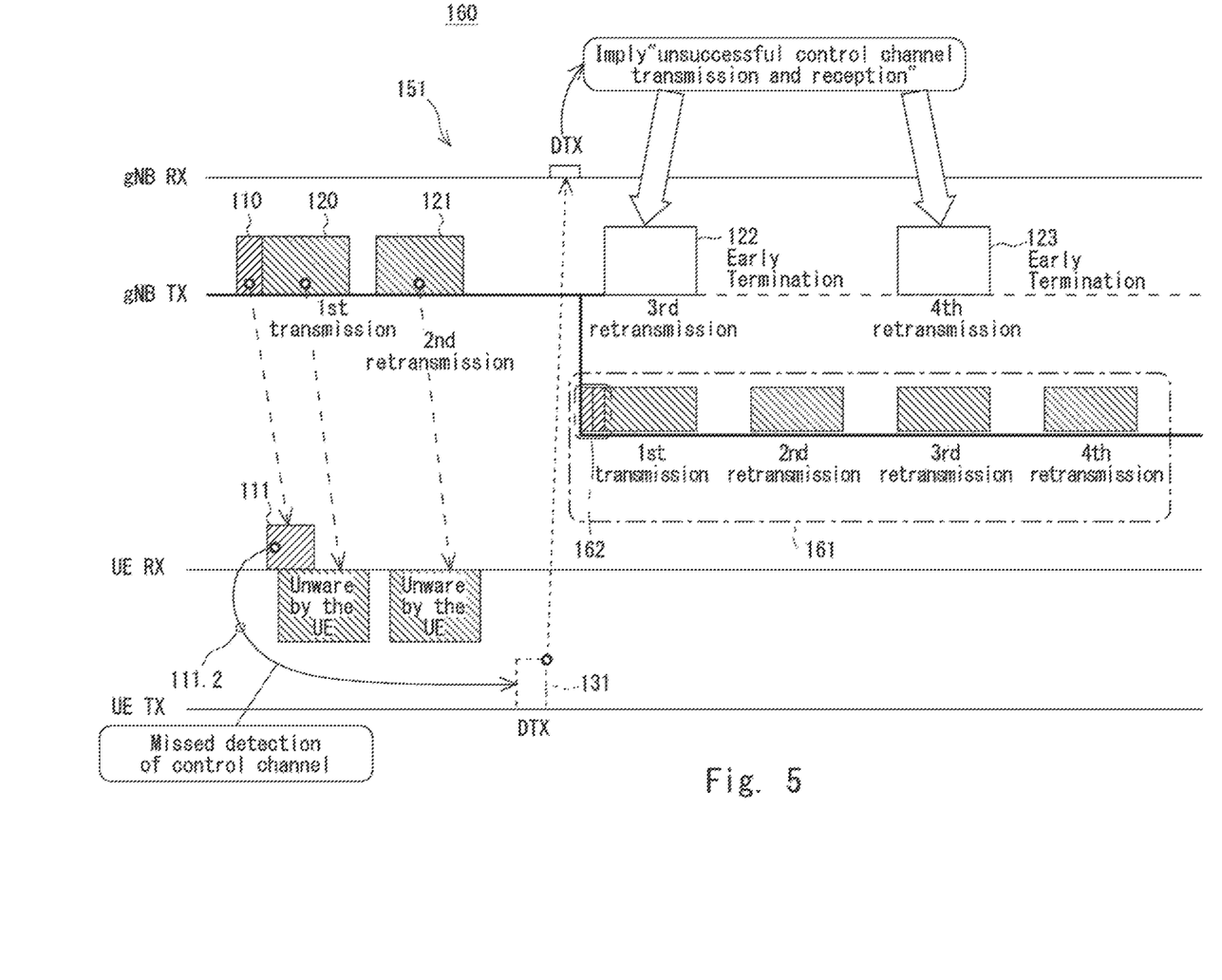
FIG. 5: Exemplary illustration of implicit indication informing the gNB on missed detection of control channel.
Figure 6:
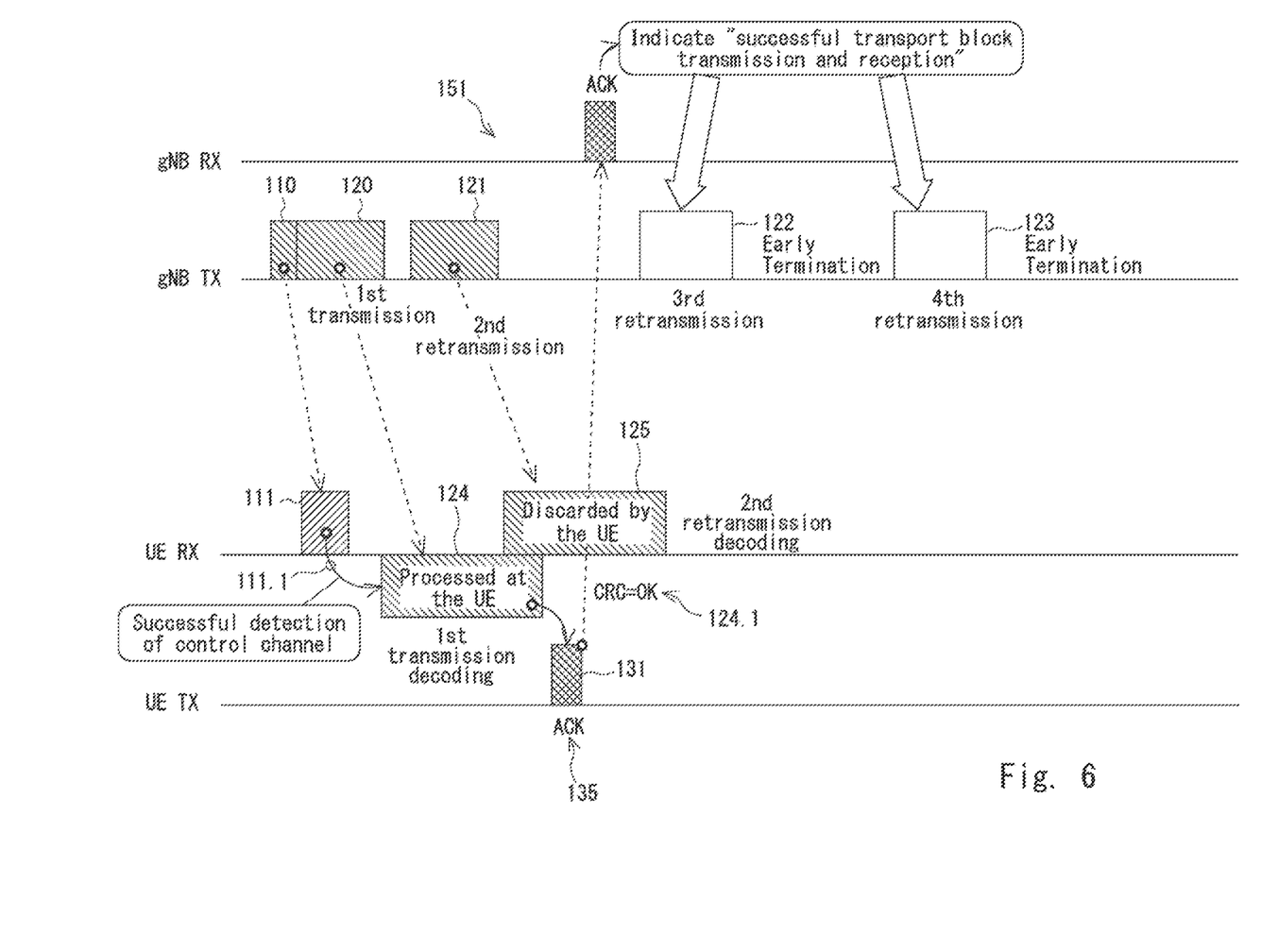
FIG. 6: Exemplary illustration of explicit indication informing the gNB on successful detection of control channel and successful decoding of associated data channel(s) transmitted in the first time-unit per repetition pattern.
Figure 7:
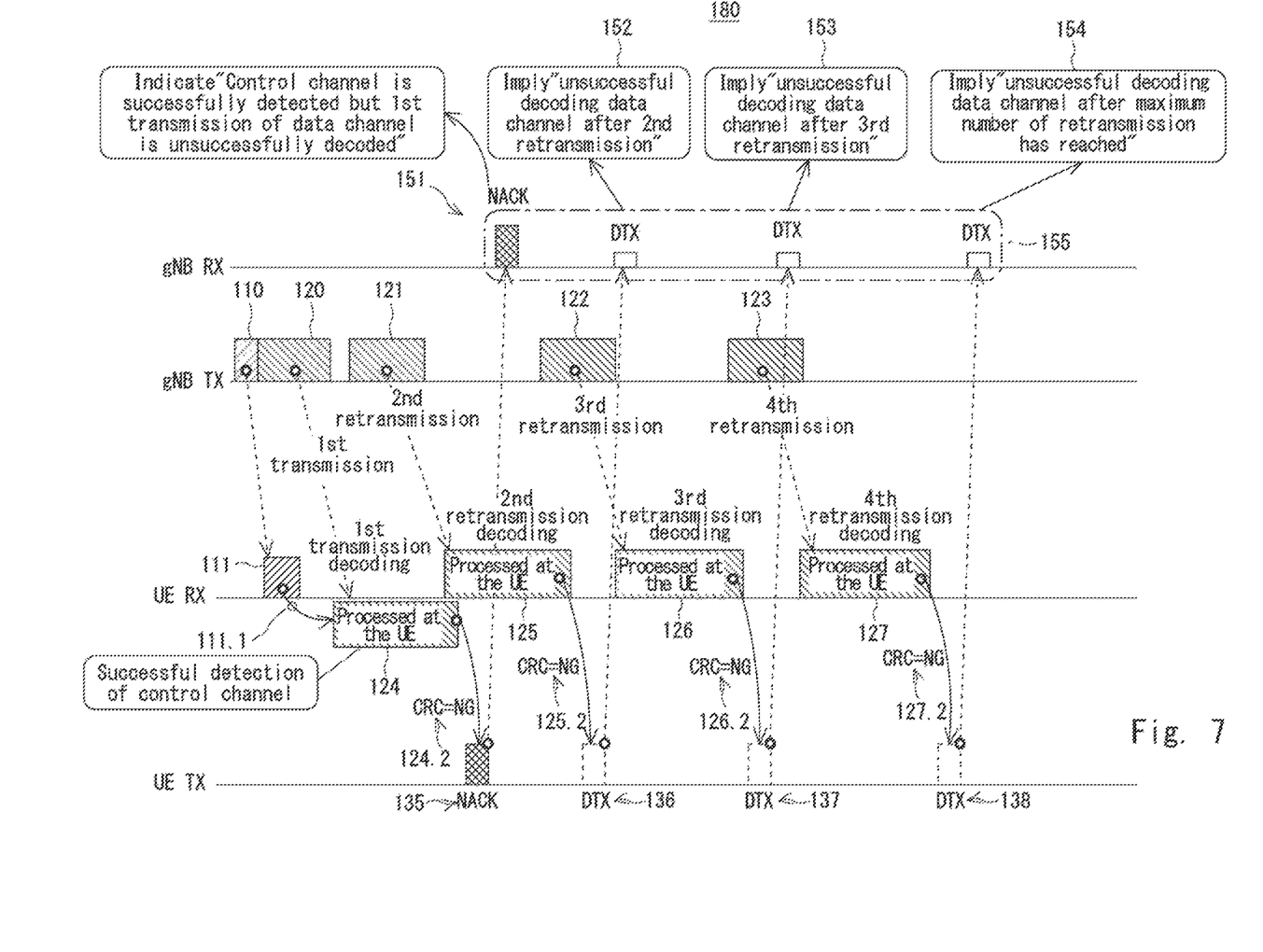
FIG. 7: Exemplary illustration of explicit and implicit indication pattern informing the gNB on successful detection of control channel and unsuccessful decoding of associated data channel(s)

The explicit indication of either ACK or NACK results from successful detection of the UEs intended control channel (e.g. 110 and 111.1). A failing to detect the UEs intended control channel (e.g. 110 and 111.2) will result in the unawareness of associated data channel transmissions, and therefore DTX occurs at the allocated control UL resources corresponding to the first time-unit having the associated data channel transmission(s) (e.g. 131). This 'DTX' scenario is further discussed in reference to exemplary FIG. 5. In reference to example 160 in FIG. 5, the UE (102) may fail to detect its intended control channel (e.g. 110, 111 & 111.2). Therefore the UE will not be aware of the associated data channels transmission (e.g. 120, 121, 122 and 123), and will not use the allocated control UL resources corresponding to the first time-unit having the associated data channel transmission(s). At the gNB (e.g. 101), with DTX observed at the allocated control UL resources corresponds to the first data channel transmission in time (e.g. 151), according to the present embodiment, the gNB (e.g. 101) can confidently interpret that the UE (e.g. 102) has failed to detect the transmitted control channel (e.g. 110). Therefore, the gNB (e.g. 101) can terminate the current and remaining transmission of the associated data channel (e.g. 122 and 123). Depending upon the importance of the transmitted URLLC data, the gNB may consider to immediately schedule the retransmission of the control and data (e.g. 161), where the gNB may enhance the transmission of the control channel with an appropriate number of control channel repetitions and/or aggregation level (e.g. 162) to improve the probability of the successful detection of the control channel at the UE; The example 170 in FIG. 6 further illustrates the scenario, where the UE uses ACK (i.e. positive acknowledgement as explicit indication to the gNB in the allocated control UL resources corresponding to the first time-unit having the associated data channel transmission(s) (e.g. 135, 131, and 120). In this scenario, upon the successful detection of the control channel (e.g. 110, 111 and 111.1), and the successful decoding of the associated data channel in the first time-unit per the indicated retransmission pattern (e.g. 120, 124 and 124.1), the UE uses "ACK" (e.g. 135) on the allocated UL control resource (e.g. 131) as explicit indication to the servicing gNB. The UE may simply discard or ignore the current (e.g. 125) and future data channel repetition (like the prior art on "early termination HARQ-less"). At the gNB (e.g. 101), with ACK detected at the allocated control UL resources corresponding to the first data channel transmission in time (e.g. 120 and 151), the gNB (e.g. 101) can confidently assume that the UE (e.g. 102) has successfully received the URLLC transport block. Therefore, the gNB (e.g. 101) can terminate the current and remaining transmission of the associated data channel (e.g. 122 and 123) as they are no longer adding value. Unlike the prior art on "early termination HARQ-less", with reference to exemplary 170—FIG. 7, upon the unsuccessful decoding of the associated data channels in the first time-unit per the indicated retransmission pattern (e.g. 120, 124 and 124.2), the UE uses 'NACK' (e.g. 135) on the allocated UL control resource (e.g. 131) as explicit indication to the servicing gNB. At the gNB (e.g. 101), with NACK detected at the allocated control UL resources corresponds to the first data channel transmission in time (e.g. 120 and 151), the gNB (e.g. 101) can confidently assume that the UE (e.g. 102) has successfully detected the control channel. However, it fails to decode the associated data channels in the first-time-unit where it may be successful in reception and decoding the associated data channels in the subsequent time-units per indicated repetition pattern (e.g. 121, 125, and 125.1)

2.2.2. In another embodiment of the present invention, in the allocated control UL resources (e.g. 132, 133, and 134), which correspond to the subsequent time-units having the associated data channel's retransmission(s) or repetition (e.g. 121. 122 and 123), the UE should use one of the following after explicitly reporting 'NACK' (FIGS. 6 and 7: 135) for the unsuccessful decoding of the associated data channels in the first time-unit per the indicated retransmission pattern:

2.2.2.1. 'ACK' as explicit indication to its servicing gNB on the successful decoding of the associated data channel (e.g. FIG. 7, 121, 125, 125.1, 136 and 132), and 2.2.2.2. 'DTX' as implicit indication to its servicing gNB on the unsuccessful decoding of the associated data channel (e.g. FIG. 7: {121, 125, 125.2, 136}; {122, 126, 126.2, 137}; {123, 127, 127.2, 138}). The advantage using 'DTX' to implicitly indicate 'NACK' is to reduce the collision probability in contending UL control resources, and also minimise interference where more than one UEs being configured to share the same set of REs for limited acknowledgement information transmission.

Figure 8A:
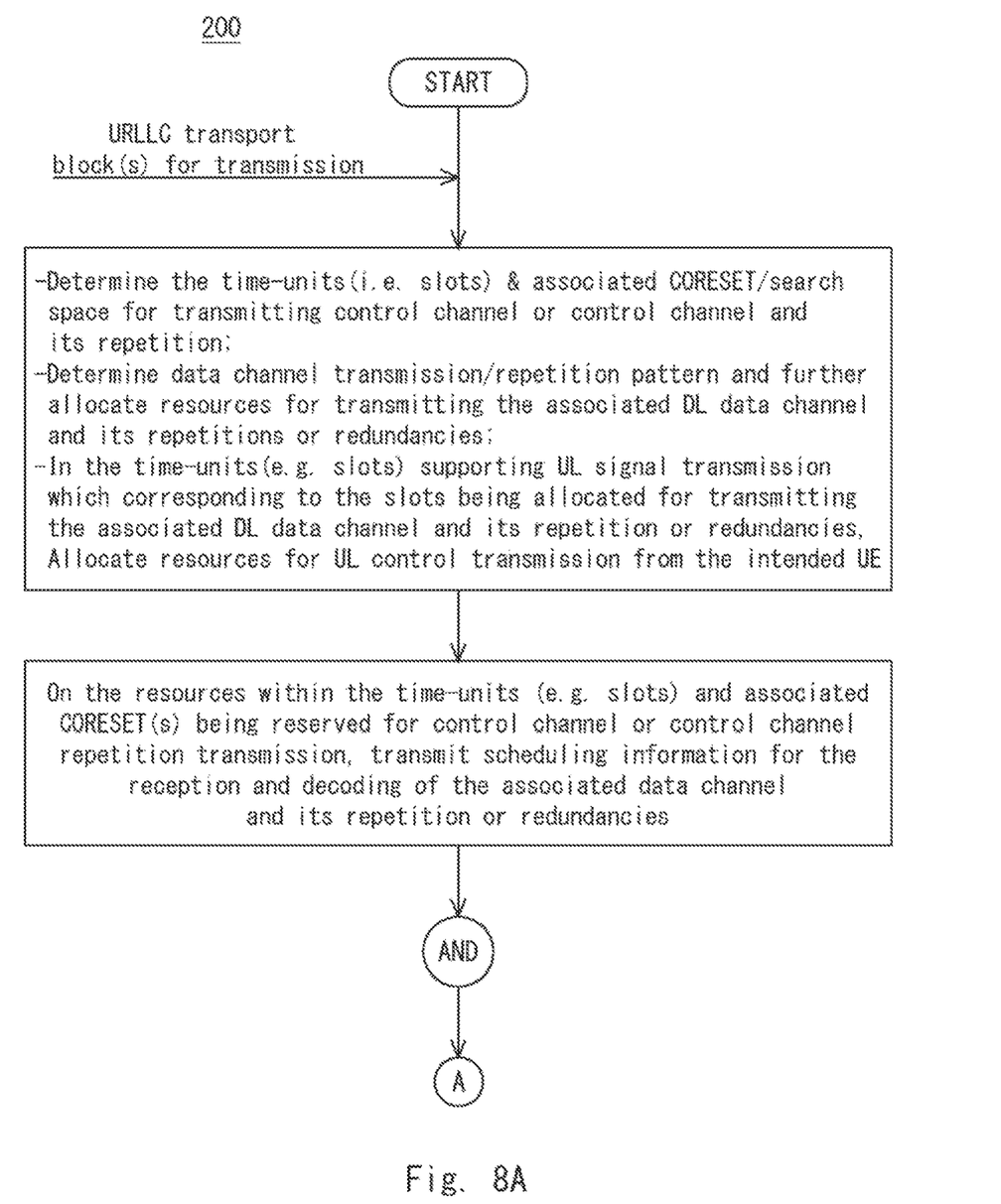
FIG. 8A: Procedure for use at a servicing gNB for realising an embodiment of the present invention.
Figure 8B:
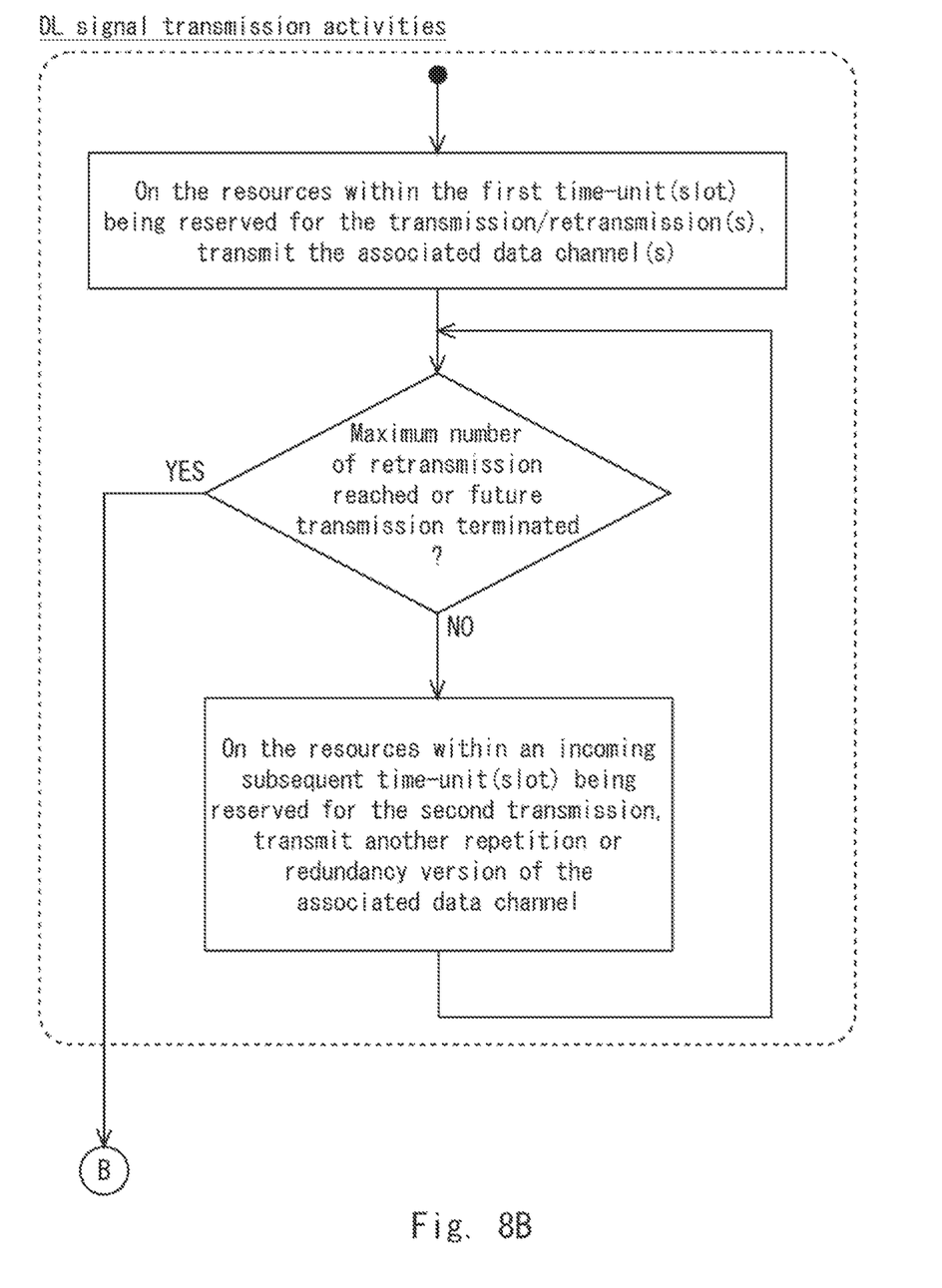
FIG. 8B: Procedure for use at a servicing gNB for realising an embodiment of the present invention.
Figure 8C:
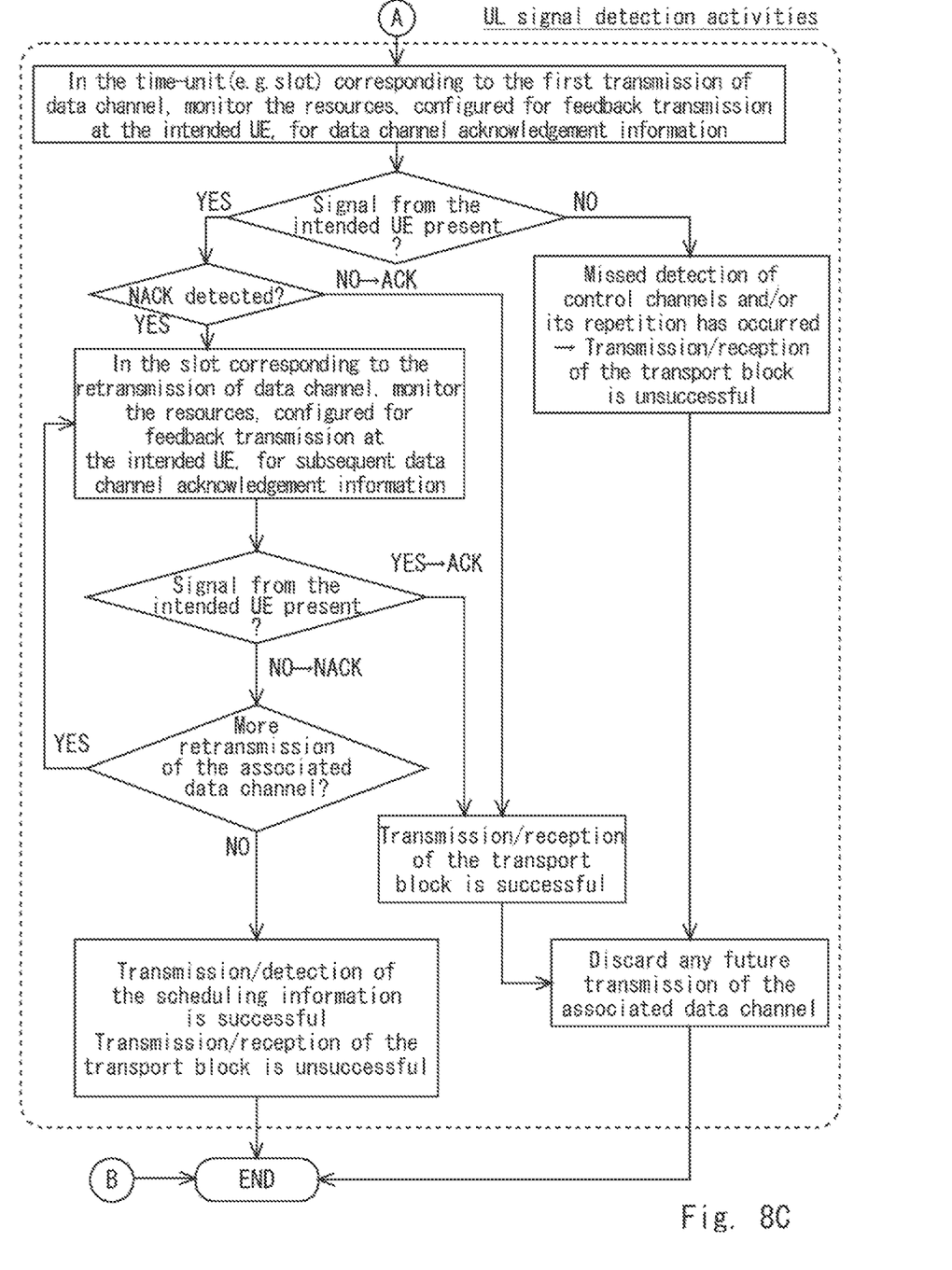
FIG. 8C: Procedure for use at a servicing gNB for realising an embodiment of the present invention.

At the gNB (e.g. 101), with ACK detected at the allocated control UL resources corresponding to any time-units having channel transmission, the gNB (e.g. 101) can confidently assume that the UE (e.g. 102) has successfully received the URLLC transport block. Therefore, the gNB (e.g. 101) can terminate the current and remaining transmission of the associated data channel (e.g. FIG. 7: 123) as they shall no longer be adding value;

At the gNB (e.g. 101), with the pattern of NACK followed by DTX(s) (e.g. FIG. 8A, 8B, 8C: 155) detected at the allocated control UL resources (FIGS. 8A, 8B, 8C: 135, 136, 137 and 138) corresponding to the data channel transmission in time (e.g. 120, 121, 122 and 123), the gNB (e.g. 101) can assume that the UE (e.g. 102) has failed to decode the associated data channels.

Figure 9:
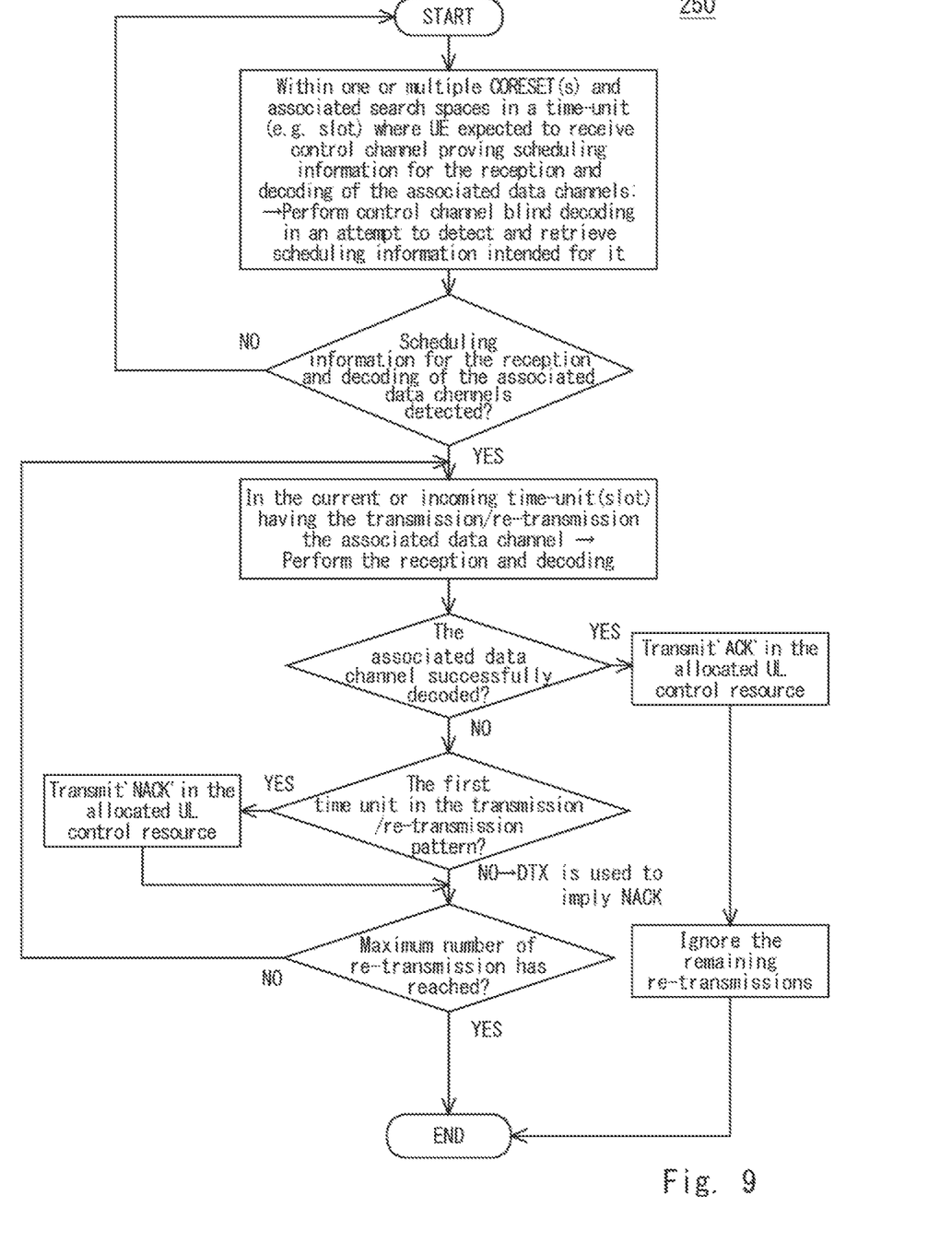
FIG. 9: Procedure for use as an UE for realising an embodiment of the present invention.

The system procedure involving both servicing gNB and the serviced UE were jointly described above, and can be separated to 2 procedures for implementation as follows:

1. procedure for use at a gNB which is illustrated through flowchart 200—see FIG. 8A, 8B, 8C, and 2. corresponding procedure for use at a UE which is illustrated through flowchart 250—see FIG. 9

The foregoing embodiments provide a mechanism for use with HARQ-less transmission technique on detection of control channel's misses-detection at an intended UE. Hence the mechanism is suitable for further use in realising early termination of associated data channel transmission and realisation of control channel link adaption on new data transmission cycle.

Limited acknowledgement information is designed for explicit feedback, hence minimising interference and collision on the shared UL control resources. The mechanism provides implicit indication of control channel detection failure at intended UE for early termination of associated data channel transmission, and implicit indication of unsuccessful decoding of associated data channel re-transmission.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The program can be stored and provided to the computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to the computer device using any type of transitory computer readable media. Examples of transitory computer readable media include electric signals, optical signals, and electromagnetic waves. Transitory computer readable media can provide the program to the computer device via a wired communication line, such as electric wires and optical fibers, or a wireless communication line.

REFERENCE SIGNS LIST

10 LTE-based asynchronous HARQ
12 NACK
13 retransmission
15 transmission and/or retransmission cycle
20 HARQ-less transmission technique
26 predefined time-pattern
27 desirable timing window
30 early termination HARQ-less
31 control channel
32, 33, 34, 35 transport block
36 DTX
101 gNB
102 UE
103 slots
110 control channel
113 scheduling information
115 UL control resources
120, 121, 122, 123 re-transitions
124 data channel
130 information reporting
131 associated data channel transmission(s)
161 control and data
200, 250 flowchart

The invention claimed is:

1. A method for performing control channel link adaptation and early termination of data channel retransmission upon a control channel missed-detection using a system, the system for a gNodeB (gNB) to detect a control channel missed detection at a plurality of User Equipments (UEs), the method comprising:

at the gNB, determining and allocating Uplink (UL) control resources for sharing among the UEs in transmitting acknowledgement information;

at the gNB, configuring the plurality of UEs with information on the shared UL control resources for further selection when having the acknowledgement information for transmission;

at the gNB, upon the arrival of a Ultra-Reliable Low-Latency Communication (URLLC) transport block for Downlink (DL) transmission, scheduling and transmitting a control channel to a UE of the plurality of UEs, and providing the UE with scheduling information including a retransmissions pattern having first slot and one or more second slots;

at the gNB, following the transmitted control channel, transmitting the associated data channel's retransmissions in the first slot and in the one or more second slots of the retransmissions pattern;

at the UE, monitoring one or more Control Resource Sets (CORESETs) and associated search spaces per configuration, for intended control channels or intended set of scheduling information for:

associated data channel's retransmission reception and decoding, and

UL control channel resource selection in transmitting acknowledgement information;

at the UE, upon successful detection of an intended set of scheduling information:

in the first slot of the retransmission pattern, performing the reception and decoding of the scheduled data channel's retransmissions; and on the UL control resource within the slot that corresponds to the first slot of the retransmission pattern, transmitting Acknowledgement (ACK) or Negative Acknowledgement (NACK) as indication to the gNB;

at the gNB, monitoring a slot of the UL control channel resources that corresponds to the first slot having the transmitted data channel's retransmission, for indication of ACK or NACK from the UE;

at the UE, upon the unsuccessful reception and decoding of all data channel's retransmissions scheduled within the first slot, in the one or more second slots per indicated retransmission pattern:

performing the reception and decoding of any remaining scheduled data channel's retransmissions; and on the UL control resource within the slot that corresponds to the one or more second slots of the retransmission pattern, transmitting ACK as indication to the gNB upon successful reception and decoding of a data channel's retransmission scheduled in the one or more second slots; and at the gNB, monitoring the UL control resource slot that corresponds to the one or more second slots having the transmitted data channel's retransmission, for indication of ACK from the UE.

2. The method according to claim 1, wherein the first slot and the one or more second slots are Time Division Multiplexed (TDM) where the first slot always occurs first in time, followed by the one or more second slots.

3. The method according to claim 2, wherein one or multiple data channel's retransmissions are frequency multiplexed onto the first slot and/or the one or more second slots.

4. The method according to claim 1, where a slot of DL control resource having control channel transmission and the first slot having associated data channel's re-transmission are the same.

5. The method according to claim 1, wherein Discontinuous Transmission (DTX) on the UL control channel resources within the slot that corresponds to the first slot having the transmitted data channel's retransmission, shall indicate that control channel missed-detection has happened at the UE.

6. The method according to claim 5, wherein an absence of signal in the configured UL control resource within in the slot corresponding to the first slot having associated data channel's retransmission, results in the Discontinuous Transmission (DTX) being observed at the gNB which indicates the control channel's missed detection at the UE.

7. The method according to claim 1, wherein Discontinuous Transmission (DTX) on the UL control channel resources within the slot that corresponds to the second slot having the transmitted data channel's retransmission, shall indicate unsuccessful data channel's decoding after an nth retransmission at the UE.

8. The method according to claim 7, wherein an absence of signal in the UL control resource within the slot, corresponding to the second slot having associated data channel's retransmissions, results in the Discontinuous Transmission (DTX) being observed at the gNB which indicates the unsuccessful decoding of the associated data channel's retransmissions.

9. The method according to claim 1, wherein the URLLC DL data transmission occurs via a scheduling Downlink Control Information (DCI).

10. The method according to claim 9, wherein the gNB indicates to the UE, the UL control resource including slots for use in transmitting the acknowledge information.

11. The method according to claim 1, wherein the monitoring the slot of UL control channel resources at the gNB is performed upon the successful detection of a control channel followed by a success of at least one associated data channel's retransmission or unsuccessful decoding of all associated data channel's retransmissions scheduled in the first slot.

12. The method according to claim 1, wherein following the NACK being reported to the gNB, on the UL control resource within a slot corresponding to the one or more second slots having associated data channel's retransmissions, a UE transmits ACK upon a success of at least one associated data channel's retransmission in the slot corresponding to the one or more second slots.

13. A method performed by a gNodeB (gNB), the method comprising:

indicating an Uplink (UL) control resource via a scheduling Downlink Control Information (DCI) to one or more User Equipments (UEs), the UL control resource including time slots for use in transmitting acknowledge information;

delivering Downlink (DL) Ultra-Reliable Low-Latency Communication (URLLC) data packets;

after receiving a Negative Acknowledgement (NACK) reported by the UE, observing a Discontinuous Transmission (DTX) within the UL control resource in a slot corresponding to the one or more second slots having associated data channel's retransmissions; and interpreting that the DTX indicates an unsuccessful decoding of the associated data channel's retransmissions.

14. The method according to claim 13, wherein the configured UL control resource has a slot corresponding to a first slot having associated data channel's retransmissions, the method further comprising:

receiving an Acknowledgement (ACK) upon a successful detection of a control channel by the UE and a success of at least one associated data channel's retransmission; or receiving a Negative Acknowledgement (NACK) upon unsuccessful decoding by the UE of an associated data channel's transmission scheduled in the slot corresponding to the one or more second slots.

15. The method according to claim 13, wherein upon observing a DTX upon an absence of signal in the UL control resource within a slot corresponding to a first slot having an associated data channel's transmission, the gNB interprets that the DTX indicates the control channel's missed detection at the UE.

16. The method according to claim 13, further comprising:

after receiving a NACK reported by the UE, observing an Acknowledgement (ACK) on the UL control resource within a slot corresponding to the one or more second slots having associated data channel's retransmissions upon a success of at least one associated data channel's retransmission in the slot corresponding to the one or more second slots.

17. A method performed by a User Equipment (UE), the method comprising:

receiving an Uplink (UL) control resource from a gNodeB (gNB) via a scheduling Downlink Control Information (DCI), the UL control resource including time slots for use in transmitting acknowledge information;

receiving Downlink (DL) Ultra-Reliable Low-Latency Communication (URLLC) data packets; and after transmitting a Negative Acknowledgement (NACK) to the gNB, performing a Discontinuous Transmission (DTX) within the UL control resource in a slot corresponding to the one or more second slots having associated data channel's retransmissions, the DTX indicating an unsuccessful decoding of the associated data channel's retransmissions.

18. The method according to claim 17, wherein the configured UL control resource has a slot corresponding to a first slot having associated data channel's retransmissions, the method further comprising:

transmitting an Acknowledgement (ACK) upon a successful detection of a control channel and a success of at least one associated data channel's retransmission; or transmitting a Negative Acknowledgement (NACK) upon unsuccessful decoding of an associated data channel's transmission scheduled in the slot corresponding to the one or more second slots.

19. The method according to claim 17, wherein upon performing a DTX upon an absence of signal in the UL control resource within a slot corresponding to a first slot having an associated data channel's transmission, the gNB interprets that the DTX indicates the control channel's missed detection at the UE.

20. The method according to claim 17, further comprising:

after transmitting a NACK to the gNB, transmitting an Acknowledgement (ACK) on the UL control resource within a slot corresponding to the one or more second slots having associated data channel's retransmissions upon a success of at least one associated data channel's retransmission in the slot corresponding to the one or more second slots.

* * * * *